United States Patent [19]
Pein et al.

[11] Patent Number: 5,627,717
[45] Date of Patent: May 6, 1997

[54] ELECTRONIC PROCESSING UNIT, AND CIRCUIT BREAKER INCLUDING SUCH A UNIT

[75] Inventors: Howard B. Pein, Briarcliff, N.Y.; Gregory T. Divincenzo, Easton, Md.; Paulo Caldiera, Scarsdale, N.Y.; Wen-Jian Gu, Croton, N.Y.; Stephen L. Wong, Scarsdale, N.Y.

[73] Assignee: Philips Electronics North America Corporation, New York, N.Y.

[21] Appl. No.: 366,149

[22] Filed: Dec. 28, 1994

[51] Int. Cl.$^6$ ............................................. H02H 3/00
[52] U.S. Cl. .............................. 361/95; 361/97; 361/115
[58] Field of Search ........................... 361/93–98, 115, 361/75

[56] References Cited

U.S. PATENT DOCUMENTS

| | | | |
|---|---|---|---|
| 4,276,510 | 6/1981 | Tompkins et al. | 324/127 |
| 4,423,459 | 12/1983 | Stich et al. | 361/94 |
| 4,589,052 | 5/1986 | Dougherty | 361/94 |
| 4,680,706 | 7/1987 | Bray | 361/75 |
| 4,741,002 | 4/1988 | Dougherty | 377/49 |
| 4,899,103 | 2/1990 | Katzenstein | 324/99 |
| 4,914,383 | 4/1990 | Wilkerson | 324/117 |

OTHER PUBLICATIONS

C. Sullender, "Magnetic Current Sensors for Space Station Freedom", IEEE, Transactions on Power electronics, vol. 8, No. 1, Jan. 1993, pp. 69–75.

*Primary Examiner*—Jeffrey A. Gaffin
*Assistant Examiner*—Stephen Jackson
*Attorney, Agent, or Firm*—Michael E. Schmitt

[57] ABSTRACT

Digital processing of current signals allows close matching of arbitrary time delay curves for a circuit breaker. An analog signal proportional to the current is sampled and digitized. Digital samples, with or without further processing, are used to select increment values from a look-up table for accumulation in a counter. The counter is decremented periodically to simulate cooling of the circuit being protected. The values in the look-up table are determined according to the desired time delay curve. Processing of the digital samples may include squaring samples, accumulating the squared values to form a subtotal which is compared with an instantaneous trip threshold, accumulating the subtotals for a time period equal to half a cycle of AC line voltage, taking the square root of the accumulated subtotals, and using that square root as the address for looking up the increment value.

21 Claims, 3 Drawing Sheets

5,627,717

ELECTRONIC PROCESSING UNIT, AND CIRCUIT BREAKER INCLUDING SUCH A UNIT

CROSS REFERENCE TO RELATED APPLICATIONS

This application is related to the subject matter of co-pending patent application Ser. No. 08/159,394 filed by Wen-Jian Gu et al for an ISOLATED CURRENT SENSOR FOR DC TO HIGH FREQUENCY APPLICATIONS and concurrently filed patent application Ser. No. 08/366,150, DC AND AC CURRENT SENSOR HAVING A MINOR-LOOP OPERATED CURRENT TRANSFORMER, by Wen-Jian Gu, both assigned to the assignee of the instant application.

BACKGROUND OF THE INVENTION

1. Field of the Invention

The invention relates to electrical circuit breakers having an electronic processing circuit for processing one or more sensor signals and providing a trip signal to open the controlled circuit. Most circuit breakers in use today have a mechanically operated switch or contact set; when electronically tripped, typically the trip signal is a current pulse through a solenoid which unlatches a spring-loaded contact set. The invention is equally applicable to a "solid state circuit breaker" which changes the state of an element from highly conducting to non-conducting.

2. Description of the Prior Art

U.S. Pat. No. 4,589,052 describes an electronic processing unit for an electronically tripped circuit breaker, having separate rating settings for instantaneous trip, and short time and long time overloads and GFI settings, using adjustable resistor values. The overall rating is set by a resistor, while trip times for instantaneous trip, short and long time overload are selectable by a switch.

This patent describes the use of digital circuitry for a current squaring function, overcurrent pickup functions, and time delay function. In a 3ϕ breaker, 4 current transformers are used to provide a composite current value, a ground fault current signal, and power for the electronic circuitry. Adjustable settings establish the level of current which will be carried indefinitely without tripping, and the overcurrent pickup (threshold) values for computing a sum of current squared multiplied by time in response to a long time relatively small overcurrent, for computing a sum of current squared multiplied by time in response to a short time relatively large overcurrent, and for instantaneous tripping in response to a very large overcurrent.

A so-called peak detecting A/D circuit provides a digital output, starting from zero once every 20 milliseconds, which rises to a value corresponding to the peak value of the composite signal during that 20 ms. This digital output is used to determine if the current exceeds any of the pickup values, and also is provided to an "$i^2 t$" circuit whose output is a frequency $f_p$ which is proportional to the square of the A/D digital output.

The long time pickup line 50 provides a binary signal indicating whether or not the peak-detected current exceeds the long time pickup level. If this level is exceeded, then a long time counter 115 counts up at a frequency $f_p/nm$; while, if the level is not exceeded, the counter 115 counts down at a different predetermined frequency $f_{cool\ LT}$ to provide a "cooling" effect. If the counter 115 output exceeds a predetermined value, a trip signal is produced. As shown in FIG. 5, a similar arrangement is provided, to operate with different pickup and timing values, to generate a trip signal if for a shorter period of time the peak detected current exceeds the short time current pickup limit.

As the above description points out, the breaker has fully independent timing circuitry for current exceeding the short time pickup level, and current exceeding the long time pickup level. As a result, a fairly large overcurrent which exceeds the short time pickup value, and lasts until the relevant counter has reached 99% of the trip value, and then drops to a value just less than the short time pickup value, will not cause tripping via the short time circuitry; however, the long time counter 115 operates at a different scaling factor, and will be at substantially less than 99% of its trip value when the drop occurs. Thus the independence of the circuits reduces the degree of protection.

Further, no non-volatile semiconductor elements are used for storing pickup or overcurrent time values; and the power supply for the electronics package is energized through the current transformers. If the circuit breaker is turned off for a second or so, or load current in all the load conductors falls to zero and remains at that value long enough so that energy stored in any filter capacitor in the power supply is largely exhausted, the values stored in the counter 115 and short time counter will be lost. As a result, if the overcurrent condition is resumed before the load wiring or devices have been deenergized long enough to cool down or otherwise recover from the previous overcurrent, dangerous overheating or other damage may occur before the breaker trips.

Another area of concern has been determination of the RMS value of the current being measured. Thermally operated circuit breakers inherently were sensitive to the RMS value, or heating value, of the current being measured. If, however, digital sensing is desired, then the sampling technique can make matching of a desired trip time delay curve unreliable.

U.S. Pat. No. 4,741,002 discloses a circuit for calculating the RMS value of a digitally sampled current. A voltage to frequency converter has an output frequency proportional to the instantaneous current value. This output is fed to a frequency squaring circuit, whose output frequency is then proportional to the square of the instantaneous current. The pulses of this output frequency are then accumulated for a period of time, and the square root of this accumulated value is calculated. This circuit has the disadvantage that, if the averaging period for calculation of the RMS value is very long, then the numbers become large and a high calculating rate and capacity are required.

SUMMARY OF THE INVENTION

An object of the invention is to provide a compact electronically tripped circuit breaker which can follow a predetermined current-time curve more accurately.

Another object of the invention is to provide such a breaker which protects against data loss effects of brief breaker openings during periods of prolonged overcurrent.

Yet another object of the invention is to integrate short term and long term overcurrent effects into one trip decision computation.

A further object of the invention is to allow matching a customer's specification for a particular (non-standard) time-current curve by programming a ROM.

Still another object of the invention is to provide such a breaker that can be utilized for AC or DC applications, covering a wide frequency range without reconfiguration, and in AC monophase or polyphase configurations.

According to the invention, the electronic processing unit for a circuit breaker includes a counter for accumulating values based on successive samples of the current signal, a circuit for periodically reducing the value stored in the counter by an amount related to the value then stored in the counter, and a circuit for providing a trip signal whenever the counter value reaches a predetermined value. The processing unit is preferably powered by a power supply which is connected to the power line conductors, and is not affected by opening or tripping of this circuit breaker itself.

In a preferred embodiment, values based on a plurality of successive current samples are accumulated, and the counter is incremented at a rate less than the current sampling rate, using the accumulated values. The current sampling rate is predetermined to be at least twice the frequency of the highest important frequency component of the load current. For AC applications, the counter is desirably incremented once each half cycle of the line frequency. Periodic reduction of the counter value is preferably performed at the same rate as the incrementing of the counter.

In this preferred embodiment, counter increment values are derived by summing squares of a number of successive current samples, normalizing these values, and subsequently taking the square root of the normalized value. The square root is used as an address into a look-up table which stores the values to be added to the counter. These stored values are derived from the desired time delay curve, and may readily be computed by solving an equation which is equivalent to that describing a leaky integrator.

Still more preferably, to avoid nuisance tripping due to very short large current spikes or noise, a fixed small number of successive current samples, such as 8, are squared and accumulated in a first accumulator, and the value of this group in this accumulator is compared with an "instantaneous trip" value to permit very fast tripping on very large overloads. When the breaker is used for conventional AC lines, successive accumulations of sample groups are themselves accumulated, for example for a time equal to half of a line voltage cycle, for determination of the RMS value and obtaining an increment value from the look-up table, to be added to the counter.

The circuit for periodically reducing the counter value preferably subtracts, each time, an amount which is a same predetermined fraction of the counter value.

DESCRIPTION OF THE PREFERRED EMBODIMENT

Figure 1:
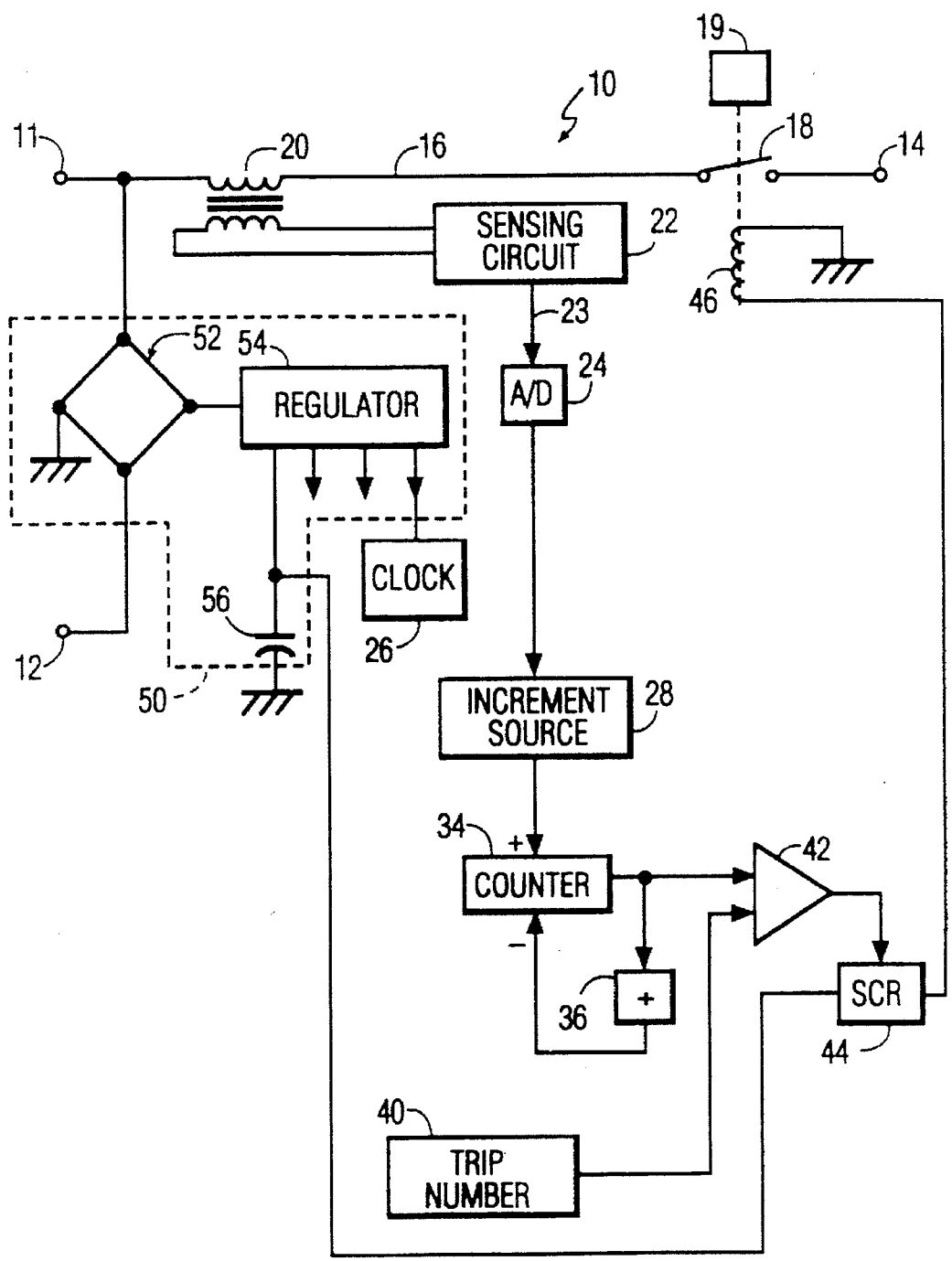
FIG. 1 is a block diagram of a circuit breaker according to the invention.

As shown in FIG. 1, an electronic trip breaker 10 has line terminals or connection points 11 and 12, and a load terminal or connection point 14. A load current bus 16 connects between a breaker contact set 18 and the line terminal 11 via a transformer 20. The breaker contact set forms a conductive electrical connection between the line and load connection points, and can be opened and closed manually by a handle 19 shown diagrammatically. The transformer 20 is connected to a sensing/driving circuit 22, whose output is a voltage level or signal 23 which is proportional to the current through the bus 16. The transformer 20 and circuit 22 are preferably of the type described in concurrently filed patent application Ser. No. 08/366,150, DC AND AC CURRENT SENSOR HAVING A MINOR-LOOP OPERATED CURRENT TRANSFORMER, by Wen-Jian Gu, assigned to the assignee of the instant application, incorporated herein by reference. This sensing arrangement measures from DC up to a relatively high frequency. Other sensors of this general type are described in U.S. Pat. Nos. 4,276,510; 4,899,103; and 4,914,383.

The signal 23 is sampled in an A/D converter 24 and converted to a succession of binary digital values, each corresponding to the absolute value of the signal 23 at the time of sampling. Sampling is performed under control of a system clock 26, whose frequency is selected to be at least twice that of any current frequency component which is desired to be sensed by the circuit 22. According to a first aspect of the invention, the digital values of successive samples of the current are then inputted to an increment source 28, to extract increment values. The increment value, as described below, is determined according to the time delay curve for that value of current. A common relationship, equivalent to the response of a simple thermal circuit breaker, requires the increment source output value to be related to the square of the current, with a predetermined scaling of the current or its square to match the time delay curve. When current waveforms do not have large spikes, and the time delay curve corresponds to such a simple breaker, the entire increment source may be a simple ROM.

It will be clear that, if a breaker is desired to have an "instantaneous trip" function in addition to the thermal equivalent time/current curve, this tripping can be achieved either by comparison of the analog current signal with an analog reference which is an instantaneous current equivalent, or comparing either the digital sample value or the increment value (or, as described below, an accumulation of a small number of successive values) with a digital reference value.

To match the time delay curve, it is necessary that the counter be reset periodically or be decremented on a regular basis. A preferred embodiment shown in FIG. 1 simulates the effect of cooling of load wiring or devices with the passage of time during and after operation. The output of counter 34 is provided to a divider 36, whose output is a subtraction value which is fed back to the counter 34 for decrementing at a predetermined rate, such as once each cycle of incrementing.

Tripping should occur when the counter output equals a stored trip threshold number 40. Preferably, this number is a constant which is a function of the rate at which the counter is updated and the maximum time on the delay curve. The trip threshold number and counter output are compared in digital comparator 42. If the counter output reaches the trip threshold number, the output of the comparator turns on an SCR 44 which provides a current pulse to a solenoid 46 which unlatches and trips open the breaker contact set 18.

According to the invention, power for the SCR 44, the counter 34 and all other electronic units is obtained from a power supply 50. In this embodiment, the supply 50 contains a full-wave bridge rectifier 52 whose inputs are connected directly to the line terminals 11 and 12. The output of rectifier 52 is provided to a regulator 54 which has regulated outputs for powering all the circuits already described. This supply arrangement ensures that the counter value, as appropriately decremented, will be maintained if the contacts 18 are opened manually and then reclosed during a period of overcurrent which may have approached the trip point on the time delay curve.

The power supply for, and circuitry of, a small electronic processing unit will frequently have too small capacity to operate the solenoid 46 reliably. To ensure a strong current pulse to the solenoid 46, a relatively large electrolytic capacitor 56 is charged by the regulator 54. When it is desired that the breaker retain the count during a period of loss of line voltage greater than the normal power supply storage capacity, the relatively large amount of energy stored in the capacitor may be used to provide increased protection by powering at least the counter circuit for a period of time after the rest of the power supply has been drained.

Counter Increment Values

The relationship between the A/D output samples and the counter increment values obtained from the increment source 28 is determined by the requirement that, given a constant RMS value of current through the breaker, the counter increments, including the effect of the subtraction for a "cooling" effect, must add up to the trip number 40 at a time determined from the specified time delay curve.

If the delay curve is simply based on the heating effect of the square of the current, and a linear cooling effect, then this is easily simulated if the D/A samples are taken at a sufficiently high rate, and the increments from the source 28 are proportional to the square of the digital sample values. Each value which is output by the current signal A/D converter may fetch its squared value from the ROM; and the ROM simply implements the squaring function. To reduce the size of the ROM, rather than storing values corresponding to all the possible current values in a ROM, intermediate values may be determined in an interpolator.

Figure 2:
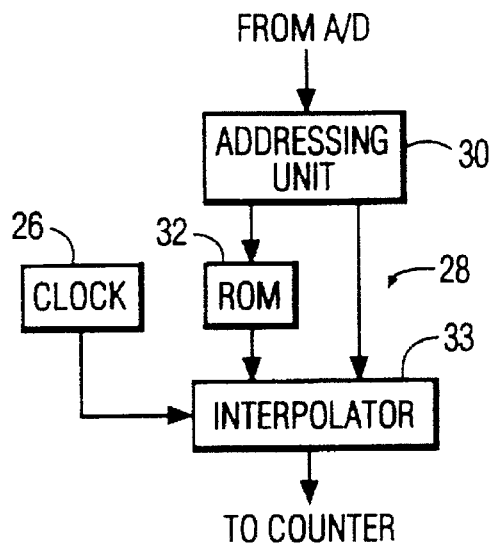
FIG. 2 is a block diagram of an embodiment of a value increment source for use with the breaker of FIG. 1.

In a preferred embodiment shown in FIG. 2, the binary digital current values from A/D 24 are provided to an addressing unit 30, from which the four most significant bits are input as address values to a ROM 32, and the less significant bits are the input to an interpolator 33. Still operating under control of the system clock 26, successive outputs of interpolator 33 are increment values which are accumulated in a counter 34.

Figure 4:
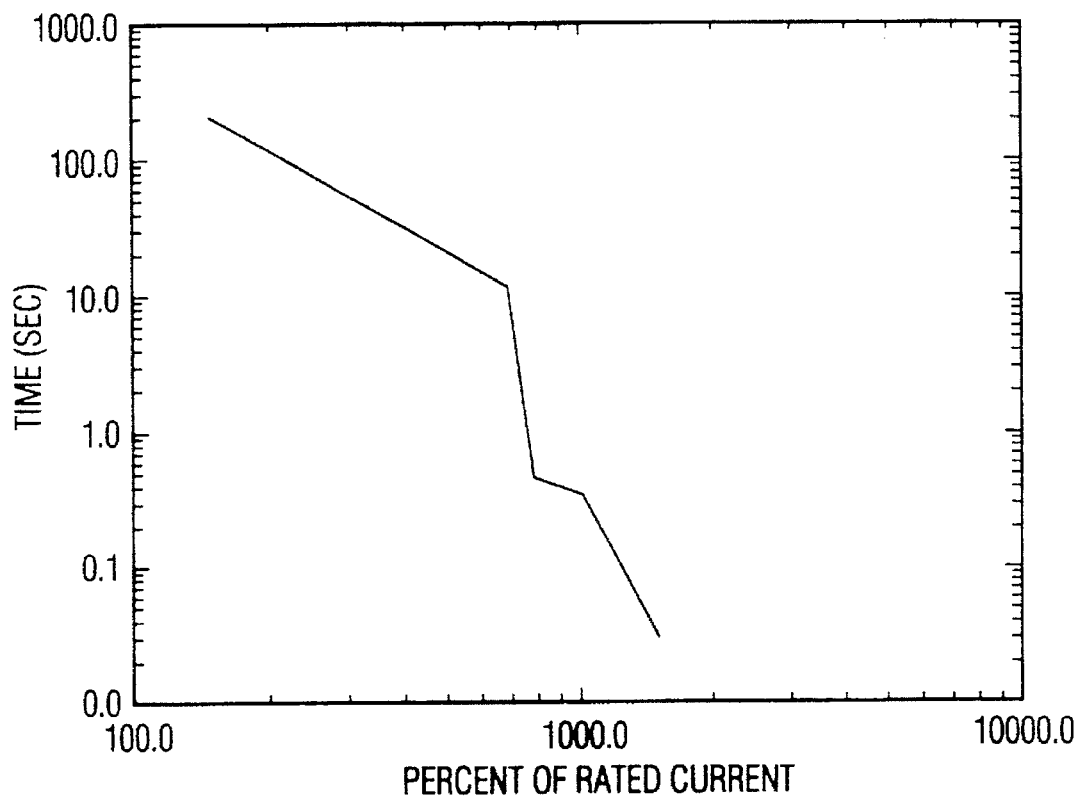
FIG. 4 is a graph showing a complex time delay curve.

If the time delay curve gives a different weight to different currents than a simple current-squaring heat effect, for example a curve as shown in FIG. 4 which gives a greater weight to high current values over certain ranges, then 1) the values stored in the ROM are no longer simply the square of the input current, but are derived from a formula described below; and 2) the address going into the ROM is the RMS value of the current over a longer period of time, rather than the value of individual samples. The reason for this procedure becomes clear when the difference between weighting the RMS value, and weighting individual samples when the peak value in an ac current is more than √2 times the RMS value, is considered. Some causes of this effect are described in U.S. Pat. No. 4,741,002 referred to above.

For example, if cooling effects are neglected for simplicity, and the trip time for 20 amperes should be 40 seconds, while the trip time for 40 amperes should be 8 seconds, then the trip time for a current which is a pulse of about 40 amperes for ¼ of each half cycle (RMS value=20 amperes) should be 40 seconds. However, incrementing based on each sample would cause tripping after only 32 seconds, as can be shown by this example: if there were 16 samples per half cycle, and 20 amperes produced a count increment of 20, the trip value would be (16 samples×20 counts×120 half-cycles×40 sec)=1,536,000. To produce 8 sec tripping, the increment for 40 amp would be 100: (16 samples×100 counts×120 half-cycles×8 sec)=1,536,000. However, if 4 samples of each cycle were 40 amp, and the other 12 were zero, then tripping would occur at 32 sec rather than 40: (4 samples×100 counts×120 half-cycles×32 sec)=1,536,000. If the time delay curve has an even greater weighting for large currents, the effect will be even more pronounced.

To prevent the effect that current pulses lasting less than ½ cycle are given undue weight, it is therefore desirable that the RMS value should be calculated for periods of at least ½ cycle. However, it is also important that calculating capacity be minimized, and that current pulses exceeding the instantaneous trip level not be overlooked.

Figure 3:
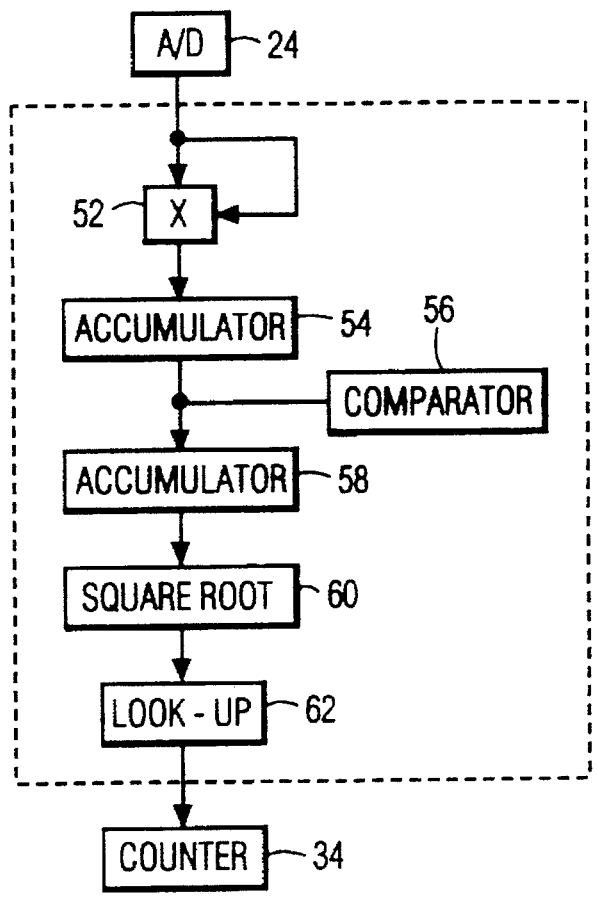
FIG. 3 is a block diagram of a value increment source using half-cycle square root calculation.

A circuit shown in FIG. 3 provides both accurate matching of time delay curves, and relatively low cost circuitry, when the current being measured has one predominant frequency such as a power line frequency, plus DC and harmonic currents. Current values are summed for ⅛ of each half cycle, to compare this sum to a reference value to provide safe "instantaneous" tripping. A digital RMS value corresponding to the true RMS value of the current samples is determined for each successive half cycle of the line frequency, and once each half cycle the digital RMS value is used as an address to select an increment value from the look-up table (ROM) and incremented in the counter.

In the preferred embodiment shown, for a 60 Hz line frequency, current is sampled at a rate of 8,640 samples per second, but is processed as 8 blocks of 8 samples. The value of each of the first 8 samples is squared in multiplier 52, and is stored in a first accumulator 54. At the time of the 9th sampling, the value in that accumulator is compared with an instantaneous trip value (number) in comparator 56 and is also stored in a second accumulator 58. The first accumulator is reset to zero, and the values of the next 8 samples are squared and accumulated. During the time for the next (the 18th) sample, the value in the first accumulator 54 is again compared with the instantaneous trip number in comparator 56, and is added to the first number in the second accumulator 58. This process is continued for the balance of 72 samplings, equivalent to ½ cycle of the line frequency. At the end of this time the RMS value for the preceding half-cycle will be available from square root calculator 60, and will be used as the address for look-up table 62 to provide an increment value to the counter 34. Preferably, in the computation of the digital RMS value, a successive approximation square root calculator is used.

During the next 72 samplings, the square root of the number which had just been accumulated in the second accumulator is calculated to 8-bit accuracy in successive approximator 60; this takes exactly 72 cycles of computation when performed by a well-known successive approximation square root calculator. At the same time, the two accumulators will have been reset, and will repeat accumulation of values corresponding to the sum of the squares of the samples for another 72 samplings, corresponding to the second half cycle.

It should be noted that this process need not be synchronized to the power line; that is, the start of the 72 sample sequence may fall at any point in the voltage or current cycle.

As referred to above, the time delay curve shown in FIG. 4 demonstrates that circuit breakers can be designed to show large changes in delay for relatively small changes in RMS current. The curve corners shown in FIG. 4 are at the following approximate values:

| Current | Time |
|---|---|
| 1. | no trip |
| 1.5 | 200 sec |
| 7. | 10 sec |
| 8. | 0.5 sec |
| 10. | 0.35 sec |
| 15. | 0.03 sec |

In electromechanical breakers, effects like this can be obtained by combining a thermal breaker element and a viscously damped magnetic breaker element in one housing. In accordance with the invention, this curve can be obtained by calculating values for the look-up table that, combined with the decrementing, will produce tripping at the correct time if a steady current of the specified RMS value flows.

Figure 5:
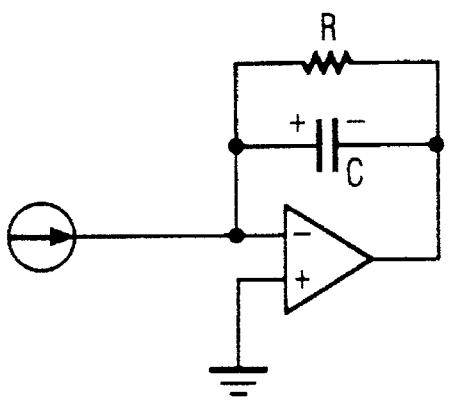
FIG. 5 shows an equivalent analog electrical circuit.

Computation of the increments to be stored are advantageously based on a model corresponding to a thermal mass cooled through a thermal resistance. If the values in the look-up table are selected to correspond to the temperature rise of a thermal mass which, when heated by the particular current and cooled by the thermal resistance, will reach a trip temperature at the time shown in the table, then the delay curve will be duplicated. An analog electrical circuit equivalent to this model is shown in FIG. 5. The voltage on the capacitor is analogous to the temperature of the thermal mass. The resistance is analogous to the thermal resistance. When the voltage on the capacitor reaches a trip value, the breaker must open. The voltage on the capacitor is given by the following equation:

$$V = R \times I \times (1 - (e)^{\frac{-t}{R \times C}})$$

In the digital circuit shown in FIG. 1, the counter value is equivalent to the voltage on the capacitor (the trip value is a digital number). The decrementing value equals the value in the counter divided by a resistance R. C=1 because each count increases the counter by 1. The current I in the equation corresponds to the increment value, and t is the time on the delay curve for a given current. By inverting this equation and solving for the increment, one can generate a table of values that relate increments to values of t on the delay curve. Each time on the delay curve has a corresponding input current level. Therefore each input current level has a corresponding increment value in the table.

The digital equivalent is:

Increment=(Trip value/R)/(1−(e)$^{-t/R}$)

The trip value will be selected to be at least equal to the number of times the counter is incremented during the longest time for which the time delay curve is defined. To provide sufficient resolution, numbers substantially larger will usually be used, ranging from 100,000 to 1,000,000 or more. Using this equation, increments are readily calculated for each break point along the curve, and as many intermediate points as are desired to achieve a given resolution.

ALTERNATIVE EMBODIMENTS

The embodiment described above can be used both with AC and DC line power, because the supply 50 is direct-connected. However, many other embodiments can utilize the invention claimed hereinafter. Smaller inverse voltage rated diodes can be used for the power supply if, for AC line power, a small step-down transformer is used. This will also enable isolation of the EPU from the input line and the load bus 16.

To allow the EPU to hold the counter value during brief outages in the line voltage, lasting up to the maximum time under the time delay curve, "keep alive" power can be provided to the counter 34 only, using a small storage capacitor or drawing power from the large capacitor 56. Depending on the particular circuit power requirements, it may be desirable to keep the clock 26, divider 36 and counter 34 running, while cutting off power to the bucking circuit 22 which is apt to involve a higher power drain. Such a mode of operation, while somewhat increasing the integrated circuit complexity, becomes fully transparent to disruptions in the line supply to a breaker panel, while maintaining substantially the same cooling curve as a conventional thermal circuit breaker.

The current sensor described in the co-pending application permits measurement of DC and AC current, and will allow true RMS approximations as described. Alternatively, a current transformer of any well-known type can be substituted, with a rectifying detector to provide an input signal to the A/D converter 24.

While the look-up table addressing scheme of the preferred embodiment should allow cost and size reduction for the EPU, a conventional current squaring circuitry could be substituted, and thereby eliminate the ROM and interpolator. Where current is expected to be primarily of a known line frequency, comparison of a filtered current signal 23 with different thresholds can be used to select one of a group of scale factors to be applied to the current values before or after squaring, so that the counter decrementing circuit effectiveness is unimpaired.

Simple division of the counter output, for decrementing, appears to be most economical. However, other count subtraction schemes are possible in order to achieve different effective "cooling" curves. If R, for example, is dependent on current, then a different computation of look-up table will be required. In particular, where a reduction in the "cooling" subtraction is desirable under some circumstances, an advantageous approach is to subtract on fewer than all the clock cycles, or to use an entirely independent rate of subtraction steps.

To change trip ratings without any change in the trip threshold number, current sensitivity may be varied by a rating module inserted between the current sensor and the A/D converter. This module may, for example, be a plug-in rating resistor module effectively changing the sensitivity of the current sensor, or a DC reference voltage for the A/D converter. These two techniques would change the instantaneous trip value proportionally to the other trip values.

Many other tripping schemes may prove feasible. For example, instead of a solenoid, which requires a high current pulse, a piezoelectric transducer may be substituted. The invention is also equally applicable to "tripping" of a full electronic breaker, where the current interruption element is based on a semiconducting element or some other form of electronic switch.

In some applications it may also be possible to energize the EPU otherwise than from the line terminals of the breaker. If ground fault sensing is not provided, there is then no need to have both lines connected to or through the breaker. It may be possible to power the EPU from a current transformer or the like, where circuit operation commences only when load current exceeds a certain percentage, such as 50%, of the rated current, so long as "keep alive" power is provided for the counter 34, or for the clock, counter and "cooling" circuit.

What is claimed is:

1. An electronically tripped circuit breaker, comprising:

a first line connection point, a load connection point, controllable means for establishing a conductive electrical connection between said first line connection point and said load connection point, and for opening said conductive electrical connection in response to a trip signal, current sensing means for sensing at least the absolute magnitude of load current flow through said conductive electrical connection, and providing a current signal related to said at least the absolute magnitude of load current, and an electronic processing unit, responsive to said current sensing means, for providing said trip signal to said controllable means, characterized in that said electronic processing unit comprises:

sampling means for producing successive digital samples of said current signal at a sampling rate, first means for determining respective increment values at an incrementing rate, each increment value corresponding to at least one of a sequence of said successive digital samples, each increment value being based on a first predetermined current/time relationship, said first predetermined current/time relationship emulating heating of a thermal mass a counter for counting and storing a value therein, means for incrementing the value, stored in said counter, with said respective increment values at said incrementing rate, second means for determining a succession of respective subtraction values based on the value then stored in said counter, taken at a decrementing rate, each subtraction value being based on a second predetermined current/time relationship, said second predetermined current/time relationship emulating cooling said thermal mass through a thermal resistance means for reducing said value stored in said counter by successively subtracting the respective subtraction values, at said decrementing rate, and means for providing said trip signal responsive to said counter value reaching a predetermined value.

2. A circuit breaker as claimed in claim 1, characterized in that each said subtraction value is a value substantially proportional to said value then stored in said counter.

3. A circuit breaker as claimed in claim 1, characterized in that said incrementing rate and said decrementing rate are equal and are less than said sampling rate.

4. A circuit breaker as claimed in claim 1, characterized in that said first means comprises a look-up table of respective increment values corresponding to different digital sample values.

5. A circuit breaker as claimed in claim 1, further comprising means for manually opening said conductive electrical connection, and power supply means for preventing loss of the stored value of said counter upon manual opening of said conductive electrical connection.

6. A circuit breaker as claimed in claim 5, further comprising a second line connection point, said first and second line connection points having a line voltage therebetween, and means responsive to said line voltage for supplying electrical power to said power supply means.

7. A circuit breaker as claimed in claim 6, further comprising energy storage means for preventing change in the stored value of said counter during a loss of said line voltage for a predetermined period of time.

8. A circuit breaker as claimed in claim 7, characterized in that said energy storage means comprises a capacitor, which also provides a current pulse to said controllable means for opening said conductive electrical connection.

9. An electronically tripped circuit breaker, comprising:

a first line connection point, a load connection point, controllable means for establishing a conductive electrical connection between said first line connection point and said load connection point, and for opening said conductive electrical connection in response to a trip signal, current sensing means for sensing at least the absolute magnitude of load current flow through said conductive electrical connection, and providing a current signal related to said at least the absolute magnitude of load current, and an electronic processing unit, responsive to said current sensing means, for providing said trip signal to said controllable means, characterized in that said electronic processing unit comprises:

sampling means for producing successive digital samples of said current signal at a sampling rate, accumulation means for successively accumulating respective digital values corresponding to respective sequences of said successive digital samples to produce respective accumulated values, first means for determining respective increment values at an incrementing rate, each increment value corresponding to at least one of said accumulated values, each increment value being based on a first predetermined current/time relationship, said first predetermined current/time relationship emulating heating of a thermal mass a counter for counting and storing a value therein, means for incrementing the value, stored in said counter, with said respective increment values at said incrementing rate, second means for determining a succession of respective subtraction values based on the value then stored in said counter, taken at a decrementing rate, each subtraction value being based on a second predetermined current/time relationship, said second predetermined current/time relationship emulating cooling said thermal mass through a thermal resistance means for reducing said value stored in said counter by successively subtracting the respective subtraction values, at said decrementing rate, and means for providing said trip signal responsive to said counter value reaching a predetermined value.

10. A circuit breaker as claimed in claim 9, characterized in that:

said accumulation means comprises means for squaring the digital samples in a respective sequence to form squared samples, and a first accumulator for accumulating the squared samples corresponding to said sequence to form a sequence subtotal.

11. A circuit breaker as claimed in claim 10, characterized in that said first means comprises a second accumulator for accumulating a plurality of successive sequence subtotals to provide a sum of squares total, and a square root calculating circuit receiving said sum of squares total and providing an output RMS value, and said first means for determining selects an increment value corresponding to said output RMS value.

12. A circuit breaker as claimed in claim 10, characterized by comprising an instantaneous trip circuit for providing said trip signal responsive to said sequence subtotal having a value at least equal to a given instantaneous trip value.

13. A circuit breaker as claimed in claim 9, characterized in that said accumulation means and said first means together comprise an RMS calculating circuit.

14. A circuit breaker as claimed in claim 13, further comprising means for manually opening said conductive electrical connection, and power supply means for preventing loss of the stored value of said counter upon manual opening of said conductive electrical connection.

15. A circuit breaker as claimed in claim 14, further comprising a second line connection point, said first and second line connection points having a line voltage therebetween, and means responsive to said line voltage for supplying electrical power to said power supply means.

16. A circuit breaker as claimed in claim 15, further comprising energy storage means for preventing change in the stored value of said counter during a loss of said line voltage for a predetermined period of time.

17. An electronic processing unit for a circuit breaker, for providing a trip signal responsive to an analog current signal meeting at least one predetermined criterion, comprising:

sampling means for producing successive digital samples of said current signal at a sampling rate, accumulation means for successively accumulating respective digital values corresponding to respective sequences of said successive digital samples to produce respective accumulated values, first means for determining respective increment values at an incrementing rate, each increment value corresponding to at least one of said accumulated values, each increment value being based on a first predetermined current/time relationship, said first predetermined current/time relationship emulating heating of a thermal mass a counter for counting and storing a value therein, means for incrementing the value, stored in said counter, with said respective increment values at said incrementing rate, second means for determining a succession of respective subtraction values based on the value then stored in said counter, taken at a decrementing rate, each subtraction value being based on a second predetermined current/time relationship, said second predetermined current/time relationship emulating cooling said thermal mass through a thermal resistance means for reducing said value stored in said counter by successively subtracting the respective subtraction values, at said decrementing rate, and means for providing said trip signal responsive to said counter value reaching a predetermined value.

18. A unit as claimed in claim 17, characterized in that said accumulation means and said first means together comprise an RMS calculating circuit.

19. A unit as claimed in claim 17, characterized in that:

said accumulation means comprises means for squaring the digital samples in a respective sequence to form squared samples, and a first accumulator for accumulating the squared samples corresponding to said sequence to form a sequence subtotal.

20. A unit as claimed in claim 19, characterized in that:

said first means comprises a second accumulator for accumulating a plurality of successive sequence subtotals to provide a sum of squares total, and a square root calculating circuit receiving said sun of squares total and providing an output RMS value, and said means for determining selects an increment value corresponding to said output RMS value.

21. A unit as claimed in claim 19, characterized by comprising an instantaneous trip circuit for providing said trip signal responsive to said sequence subtotal having a value at least equal to a given instantaneous trip value.

* * * * *